(12) United States Patent
Gordon et al.

(10) Patent No.: US 9,483,948 B1
(45) Date of Patent: *Nov. 1, 2016

(54) AUTOMATED CONTROL OF INTERACTIONS BETWEEN SELF-DRIVING VEHICLES AND PEDESTRIANS

(71) Applicant: INTERNATIONAL BUSINESS MACHINES CORPORATION, Armonk, NY (US)

(72) Inventors: Michael S. Gordon, Yorktown Heights, NY (US); James R. Kozloski, New Fairfield, CT (US); Ashish Kundu, New York, NY (US); Peter K. Malkin, Ardsley, NY (US); Clifford A. Pickover, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/820,605

(22) Filed: Aug. 7, 2015

(51) Int. Cl.
  *G05D 1/12* (2006.01)
  *G08G 1/16* (2006.01)
  *G05D 1/02* (2006.01)
  (Continued)

(52) U.S. Cl.
  CPC ............ *G08G 1/166* (2013.01); *G05D 1/0055* (2013.01); *G05D 1/0212* (2013.01); *G07C 5/0808* (2013.01); *G05D 2201/02* (2013.01)

(58) Field of Classification Search
  CPC .. G08G 1/166; G05D 1/0212; G05D 1/0055; G05D 2201/01; C07C 5/0808
  See application file for complete search history.

(56) References Cited

U.S. PATENT DOCUMENTS 5,975,791 A  11/1999 McCulloch
6,064,970 A   5/2000 McMillan et al.
6,326,903 B1 12/2001 Gross et al.
(Continued)

FOREIGN PATENT DOCUMENTS

CN   1135063    11/1996
CN   202012052  10/2011
(Continued)

OTHER PUBLICATIONS

Fox, Michelle. "Driverless Cars Safer than Regular Cars: Bob Lutz." CNBC. Sep. 8, 2014. Web. <http://www.cnbc.com/id/101981455>.

(Continued)

*Primary Examiner* — Yuen Wong
(74) *Attorney, Agent, or Firm* — Law Office of Jim Boice

(57) ABSTRACT

An SDV on-board computer on an SDV receives an SDV recognition signal from a pedestrian signal transceiver worn by a pedestrian. An SDV signal transceiver on the SDV transmits a pedestrian acknowledgement message to the signal transceiver worn by the pedestrian. The SDV on-board computer receives a pedestrian movement signal from a set of pedestrian sensors that monitor movement of the pedestrian. The SDV on-board computer receives an SDV movement signal from a set of SDV sensors on the SDV that track movement of the SDV. The SDV on-board computer, based on the SDV movement signal and the pedestrian movement signal, directs an SDV control processor on the SDV to modify the movement of the SDV in order to provide the pedestrian with time and space required to avoid the pedestrian being struck by the SDV, and notifies the pedestrian that this SDV movement modification will occur.

17 Claims, 7 Drawing Sheets

(51) Int. Cl.
*G05D 1/00* (2006.01)
*G07C 5/08* (2006.01)

(56) References Cited

U.S. PATENT DOCUMENTS

| | | |
|---|---|---|
| 6,502,035 B2 | 12/2002 | Levine |
| 6,587,043 B1 | 7/2003 | Kramer |
| 6,622,082 B1 | 9/2003 | Schmidt et al. |
| 6,731,202 B1 | 5/2004 | Klaus |
| 7,124,088 B2 | 10/2006 | Bauer et al. |
| 7,877,269 B2 | 1/2011 | Bauer et al. |
| 7,894,951 B2 | 2/2011 | Norris et al. |
| 8,031,062 B2 | 10/2011 | Smith |
| 8,078,349 B1 | 12/2011 | Prada Gomez et al. |
| 8,090,598 B2 | 1/2012 | Bauer et al. |
| 8,139,109 B2 | 3/2012 | Schmiedel et al. |
| 8,140,358 B1 | 3/2012 | Ling et al. |
| 8,180,322 B2 | 5/2012 | Nakae et al. |
| 8,489,434 B1 | 7/2013 | Otis et al. |
| 8,509,982 B2 | 8/2013 | Montemerlo et al. |
| 8,660,734 B2 | 2/2014 | Zhu et al. |
| 8,793,046 B2 | 7/2014 | Lombrozo et al. |
| 8,874,305 B2 | 10/2014 | Dolgov et al. |
| 8,880,270 B1 | 11/2014 | Ferguson et al. |
| 8,903,591 B1 | 12/2014 | Ferguson et al. |
| 8,948,955 B2 | 2/2015 | Zhu et al. |
| 8,949,016 B1 | 2/2015 | Ferguson et al. |
| 8,954,217 B1 | 2/2015 | Montemerlo et al. |
| 8,954,252 B1 | 2/2015 | Urmson et al. |
| 8,954,261 B2 | 2/2015 | Das et al. |
| 8,958,943 B2 | 2/2015 | Bertosa et al. |
| 8,965,621 B1 | 2/2015 | Urmson et al. |
| 8,983,705 B2 | 3/2015 | Zhu et al. |
| 8,996,224 B1 | 3/2015 | Herbach et al. |
| 9,014,905 B1 | 4/2015 | Kretzschmar et al. |
| 9,020,697 B2 | 4/2015 | Ricci et al. |
| 9,024,787 B2 | 5/2015 | Alshinnawi et al. |
| 9,082,239 B2 | 7/2015 | Ricci |
| 9,305,411 B2 | 4/2016 | Ricci |
| 2004/0199306 A1 | 10/2004 | Heilmann et al. |
| 2005/0104745 A1 | 5/2005 | Bachelder et al. |
| 2006/0106671 A1 | 5/2006 | Biet |
| 2006/0200379 A1 | 9/2006 | Biet |
| 2007/0100687 A1 | 5/2007 | Yoshikawa |
| 2008/0048850 A1 | 2/2008 | Yamada |
| 2009/0248231 A1 | 10/2009 | Kamiya |
| 2010/0179720 A1 | 7/2010 | Lin et al. |
| 2012/0277947 A1 | 11/2012 | Boehringer et al. |
| 2013/0030657 A1 | 1/2013 | Chatterjee et al. |
| 2013/0261871 A1 | 10/2013 | Hobbs et al. |
| 2014/0095214 A1 | 4/2014 | Mathe et al. |
| 2014/0129073 A1 | 5/2014 | Ferguson |
| 2014/0136045 A1* | 5/2014 | Zhu .................. G05D 1/0214 701/23 |
| 2014/0188999 A1 | 7/2014 | Leonard et al. |
| 2014/0195213 A1 | 7/2014 | Kozloski et al. |
| 2014/0214255 A1 | 7/2014 | Dolgov et al. |
| 2014/0222277 A1 | 8/2014 | Tsimhoni et al. |
| 2014/0297116 A1 | 10/2014 | Anderson et al. |
| 2014/0310186 A1 | 10/2014 | Ricci |
| 2014/0324268 A1 | 10/2014 | Montemerlo et al. |
| 2014/0358331 A1 | 12/2014 | Prada Gomez et al. |
| 2014/0358353 A1 | 12/2014 | Ibanez-Guzman et al. |
| 2015/0006005 A1 | 1/2015 | Yu et al. |
| 2015/0035685 A1 | 2/2015 | Strickland et al. |
| 2015/0051778 A1 | 2/2015 | Mueller |
| 2015/0066284 A1 | 3/2015 | Yopp |
| 2015/0095190 A1 | 4/2015 | Hammad et al. |
| 2015/0134178 A1 | 5/2015 | Minoiu-Enache |

FOREIGN PATENT DOCUMENTS

| | | |
|---|---|---|
| CN | 102650882 | 8/2012 |
| CN | 202772924 | 3/2013 |
| WO | 2014058263 A1 | 4/2014 |
| WO | 2014147361 A1 | 9/2014 |
| WO | 2014148975 A1 | 9/2014 |
| WO | 2014148976 A1 | 9/2014 |
| WO | 2015024616 A1 | 2/2015 |
| WO | 2015056105 A1 | 4/2015 |

OTHER PUBLICATIONS

Gomes, Lee. "Google's Self-Driving Cars Still Face Many Obstacles | MIT Technology Review." MIT Technology Review. Aug. 28, 2014. Web. <http://www.technologyreview.com/news/530276/hidden-obstacles-for-googles-self-driving-cars/>.
Smith, Mark. "Innovations: Emerging Trends in the Wheelchair Market." New Mobility Magazine, Aug. 1, 2014. Web. <http://www.newmobility.com/2014/08/emerging-trends/>.
P. Mell et al., "NIST Definition Fo Cloud Computing", National Institute of Standards and Tchnology, Information Technology Labratory, Sep. 2011, pp. 1-7.
X. Jardin, "Terrifying Dashcam Video Captures Distracted Teen Drivers Crashing While Goofing Off", Boing Boing, www/boingboing.net, Mar. 26, 2015, 1 Page.
U.S. Appl. No. 14/887,388, filed Oct. 20, 2015.
A. Abkowitz, "Do Self-Driving Cars Spell Doom for Auto Insurers?", Bloomberg L.P., Sep. 10, 2014, pp. 1-2.
Anonymous, "Self-Driving Cars and Insurance", Insurance Information Institute, Inc., Feb. 2015, pp. 1-3.
Crothers, Brooke. "Google Now Reporting Self-Driving Car Accidents: Her, it'S Not the Car's Fault". forbes.com, Jun. 8, 2015. <http:/www.forbes.com/sites/brookecrothers/2015/06/08/google-now-reportibg-driverless-car-accidents/>.
Anonymous, 'System and Method to Target Advertisements for the Right Focus Group'. ip.com, No. 000218285, May 31, 2012, pp. 1-2.
Anonymous, "Car Built-In Mechanism to Enforce Mandatory Self-Driving Mode", ip.com, No. 000234916, Feb. 14 2014, pp. 1-3.
T. Horberry et al., "Driver Distraction: The Effects of Concurrent In-Vehicle Tasks, Road Enviornment Complexity and Age on Driving Performance", Elsevier Ltd., Accident Analysis and Prevention, 38, 2006, pp. 185-191.
J. Miller, "Self-Driving Car Technologu's Benefits, Potential Risks, and Solutions", The Energy Collective, theenergycollective.com, Aug. 19, 2014, pp. 1-7.
J. O'Callaghan, "Inside the Mercedes Self-Guidubg Car That's Built for Luxurious Living in, Not Driving", Associated Newspapers Ltd., Daily Mail, dailymail.com.uk, Jan. 6, 2015, pp. 1-13.
J. Wei et al., "Towards a Viable Autonomous Driving Research Platform", IEEE, Intelegent Vehicles Symposium (IV), 2013, pp. 1-8.
J. Farrier, "Airlines Infuse Their Planes With Smells to Calm You Down", Neatorama, neatorama.com, Mar. 29, 2015, 1 Page.
T. Vanderbilt, "Let the Robot Drive: The Autonomous Car of the Future is Here", Wired Magazine, Conde Nast, www.wired.com, Jan. 20, 2012. pp. 1-34.
Chen S, et al., A Crash Risk Assessment Model for Roas Curves. Inproceedings 20th International Technical Conference on the Enhanced Saftey of Vehicles., 2007. Lyon, France.
E. Lehrer, "The Insurance Implications of Google's Self-Driving Car", Insurance Journal, Right Street Bloh=G, May 28, 2014, pp. 1-2.
Anonymous, "Diagnostics Mechanism for Self-Driving Cars to Validate Self-Driving Capabilities", ip.com, Jun. 6, 2014, pp. 1-5. ip.com.
U.S. Appl. No. 14/855,731 Non-Final Office Action Mailed Apr. 15, 2016.

* cited by examiner

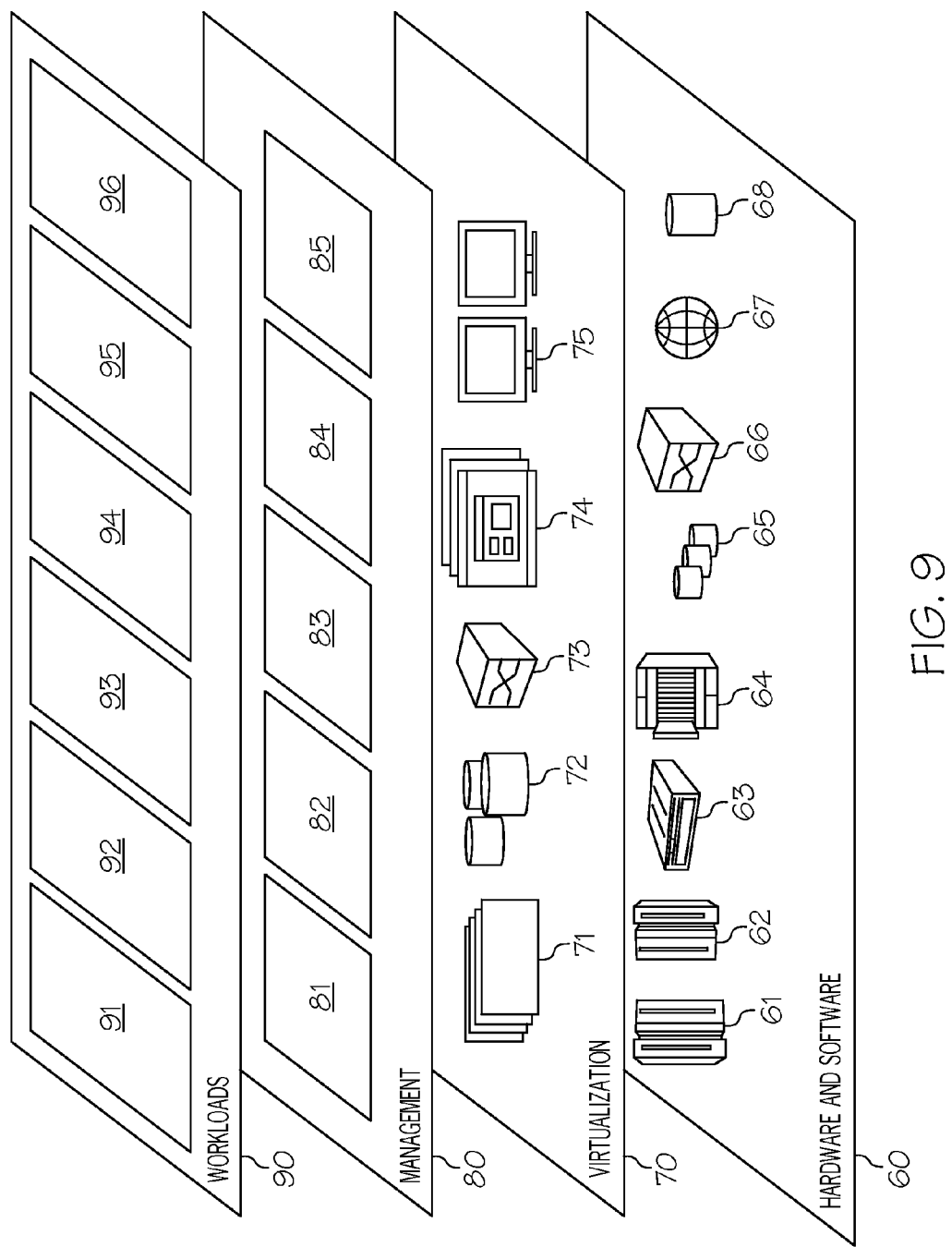

US 9,483,948 B1

AUTOMATED CONTROL OF INTERACTIONS BETWEEN SELF-DRIVING VEHICLES AND PEDESTRIANS

BACKGROUND

The present disclosure relates to the field of vehicles, and specifically to the field of self-driving vehicles (SDVs). Still more specifically, the present disclosure relates to the field of controlling self-driving vehicles when proximate to a pedestrian.

Self-driving vehicles (SDVs) are vehicles that are able to autonomously drive themselves through private and/or public spaces. Using a system of sensors that detect the location and/or surroundings of the SDV, logic within or associated with the SDV controls the speed, propulsion, braking, and steering of the SDV based on the sensor-detected location and surroundings of the SDV.

SUMMARY

A computer-implemented method, system, and/or computer program product controls a physical interaction between a self-driving vehicle (SDV) and a pedestrian. An SDV on-board computer on the SDV receives an SDV recognition signal from a pedestrian signal transceiver worn by a pedestrian. The SDV recognition signal indicates that the pedestrian observes a presence of the SDV moving towards the pedestrian. An SDV signal transceiver transmits a pedestrian acknowledgement message to the signal transceiver worn by the pedestrian. The pedestrian acknowledgement message indicates that the SDV on-board computer on the SDV has received the SDV recognition signal from the pedestrian. The SDV on-board computer receives a pedestrian movement signal from a set of pedestrian sensors that monitor movement of the pedestrian. The pedestrian movement signal describes a current speed and direction of movement of the pedestrian as the pedestrian initiates movement towards a position on the roadway that is being approached by the SDV. The pedestrian movement signal is generated in response to the pedestrian signal receiver receiving the pedestrian acknowledgement message. The SDV on-board computer receives an SDV movement signal from a set of SDV sensors on the SDV that track movement of the SDV. The SDV movement signal describes a current speed and direction of movement of the SDV. The SDV on-board computer, based on the SDV movement signal and the pedestrian movement signal, directs an SDV control processor on the SDV to modify the movement of the SDV in order to provide the pedestrian with time and space required to avoid being struck by the SDV as the pedestrian enters the position on the roadway that is being approached by the SDV. A transmitter transmits, to the pedestrian signal receiver, a directive message notifying the pedestrian that the SDV will provide the pedestrian with the time and space required to avoid being struck by the SDV. The on-board computer on the SDV adjusts the current speed and direction of movement of the SDV in order to avoid striking the pedestrian at the position on the roadway that is being approached by the SDV.

BRIEF DESCRIPTION OF THE DRAWINGS

FIG. 9 depicts abstraction model layers according to an embodiment of the present disclosure.

DETAILED DESCRIPTION

Figure 1:
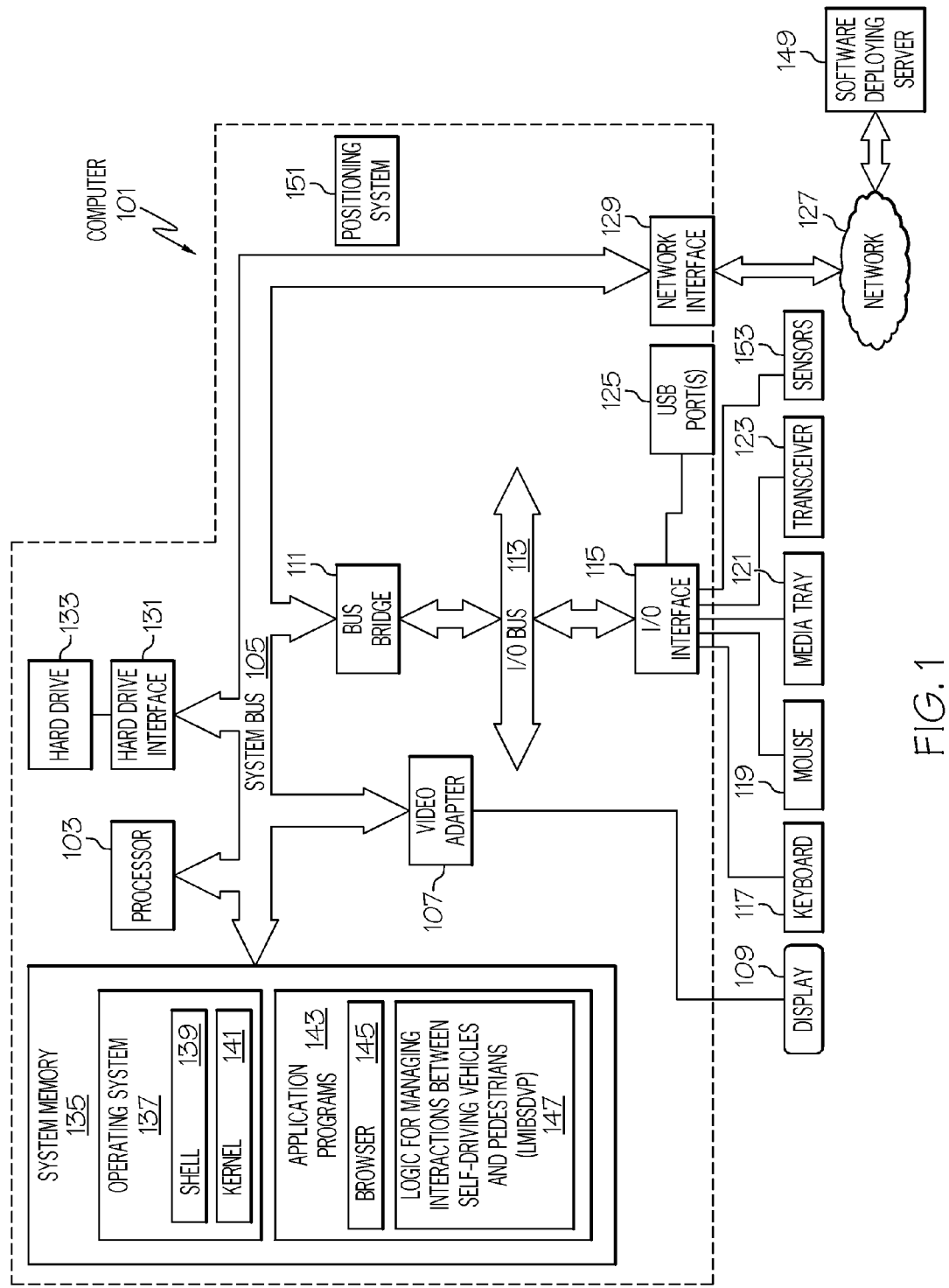
FIG. 1 depicts an exemplary system and network in which the present disclosure may be implemented.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular to FIG. 1, there is depicted a block diagram of an exemplary system and network that may be utilized by and/or in the implementation of the present invention. Some or all of the exemplary architecture, including both depicted hardware and software, shown for and within computer 101 may be utilized by software deploying server 149 shown in FIG. 1, roadway monitoring computer 201 shown in FIG. 2, and/or pedestrian computer 301 shown in FIG. 3, and/or SDV on-board computer 401 shown in FIG. 4, and/or a coordinating server 501 depicted in FIG. 5.

Exemplary computer 101 includes a processor 103 that is coupled to a system bus 105. Processor 103 may utilize one or more processors, each of which has one or more processor cores. A video adapter 107, which drives/supports a display 109, is also coupled to system bus 105. System bus 105 is coupled via a bus bridge 111 to an input/output (I/O) bus 113. An I/O interface 115 is coupled to I/O bus 113. I/O interface 115 affords communication with various I/O devices, including a keyboard 117, a mouse 119, a media tray 121 (which may include storage devices such as CD-ROM drives, multi-media interfaces, etc.), a transceiver 123 (capable of transmitting and/or receiving electronic communication signals), and external USB port(s) 125. While the format of the ports connected to I/O interface 115 may be any known to those skilled in the art of computer architecture, in one embodiment some or all of these ports are universal serial bus (USB) ports.

As depicted, computer 101 is able to communicate with a software deploying server 149 and/or other devices/systems (e.g., establishing communication among roadway monitoring computer 201, pedestrian computer 301, SDV on-board computer 401, and/or coordinating server 501 depicted in the figures below) using a network interface 129. Network interface 129 is a hardware network interface, such as a network interface card (NIC), etc. Network 127 may be an external network such as the Internet, or an internal network such as an Ethernet or a virtual private network (VPN). In one or more embodiments, network 127 is a wireless network, such as a Wi-Fi network, a cellular network, etc.

A hard drive interface 131 is also coupled to system bus 105. Hard drive interface 131 interfaces with a hard drive 133. In one embodiment, hard drive 133 populates a system memory 135, which is also coupled to system bus 105. System memory is defined as a lowest level of volatile memory in computer 101. This volatile memory includes additional higher levels of volatile memory (not shown), including, but not limited to, cache memory, registers and buffers. Data that populates system memory 135 includes computer 101's operating system (OS) 137 and application programs 143.

OS 137 includes a shell 139, for providing transparent user access to resources such as application programs 143. Generally, shell 139 is a program that provides an interpreter and an interface between the user and the operating system. More specifically, shell 139 executes commands that are entered into a command line user interface or from a file. Thus, shell 139, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 141) for processing. While shell 139 is a text-based, line-oriented user interface, the present invention will equally well support other user interface modes, such as graphical, voice, gestural, etc.

As depicted, OS 137 also includes kernel 141, which includes lower levels of functionality for OS 137, including providing essential services required by other parts of OS 137 and application programs 143, including memory management, process and task management, disk management, and mouse and keyboard management.

Application programs 143 include a renderer, shown in exemplary manner as a browser 145. Browser 145 includes program modules and instructions enabling a world wide web (WWW) client (i.e., computer 101) to send and receive network messages to the Internet using hypertext transfer protocol (HTTP) messaging, thus enabling communication with software deploying server 149 and other systems.

Application programs 143 in computer 101's system memory (as well as software deploying server 149's system memory) also include Logic for Managing Interactions Between Self-Driving Vehicles and Pedestrians (LMIDB-SDVP) 147. LMIDBSDVP 147 includes code for implementing the processes described below, including those described in FIGS. 2-6. In one embodiment, computer 101 is able to download LMIDBSDVP 147 from software deploying server 149, including in an on-demand basis, wherein the code in LMIDBSDVP 147 is not downloaded until needed for execution. In one embodiment of the present invention, software deploying server 149 performs all of the functions associated with the present invention (including execution of LMIDBSDVP 147), thus freeing computer 101 from having to use its own internal computing resources to execute LMIDBSDVP 147.

Also within computer 101 is a positioning system 151, which determines a real-time current location of computer 101 (particularly when part of a self-driving vehicle as described herein). Positioning system 151 may be a combination of accelerometers, speedometers, etc., or it may be a global positioning system (GPS) that utilizes space-based satellites to provide triangulated signals used to determine two-dimensional or three-dimensional locations.

Also associated with computer 101 are sensors 153, which detect an environment of the computer 101. More specifically, sensors 153 are able to detect vehicles, road obstructions, pavement, etc. For example, if computer 101 is on board a self-driving vehicle (SDV), then sensors 153 may be cameras, radar transceivers, etc. that allow the SDV to detect the environment (e.g., other vehicles, road obstructions, pavement, etc.) of that SDV, thus enabling it to be autonomously self-driven. Similarly, sensors 153 may be cameras, thermometers, moisture detectors, etc. that detect ambient weather conditions.

The hardware elements depicted in computer 101 are not intended to be exhaustive, but rather are representative to highlight essential components required by the present invention. For instance, computer 101 may include alternate memory storage devices such as magnetic cassettes, digital versatile disks (DVDs), Bernoulli cartridges, and the like. These and other variations are intended to be within the spirit and scope of the present invention.

Figure 2:
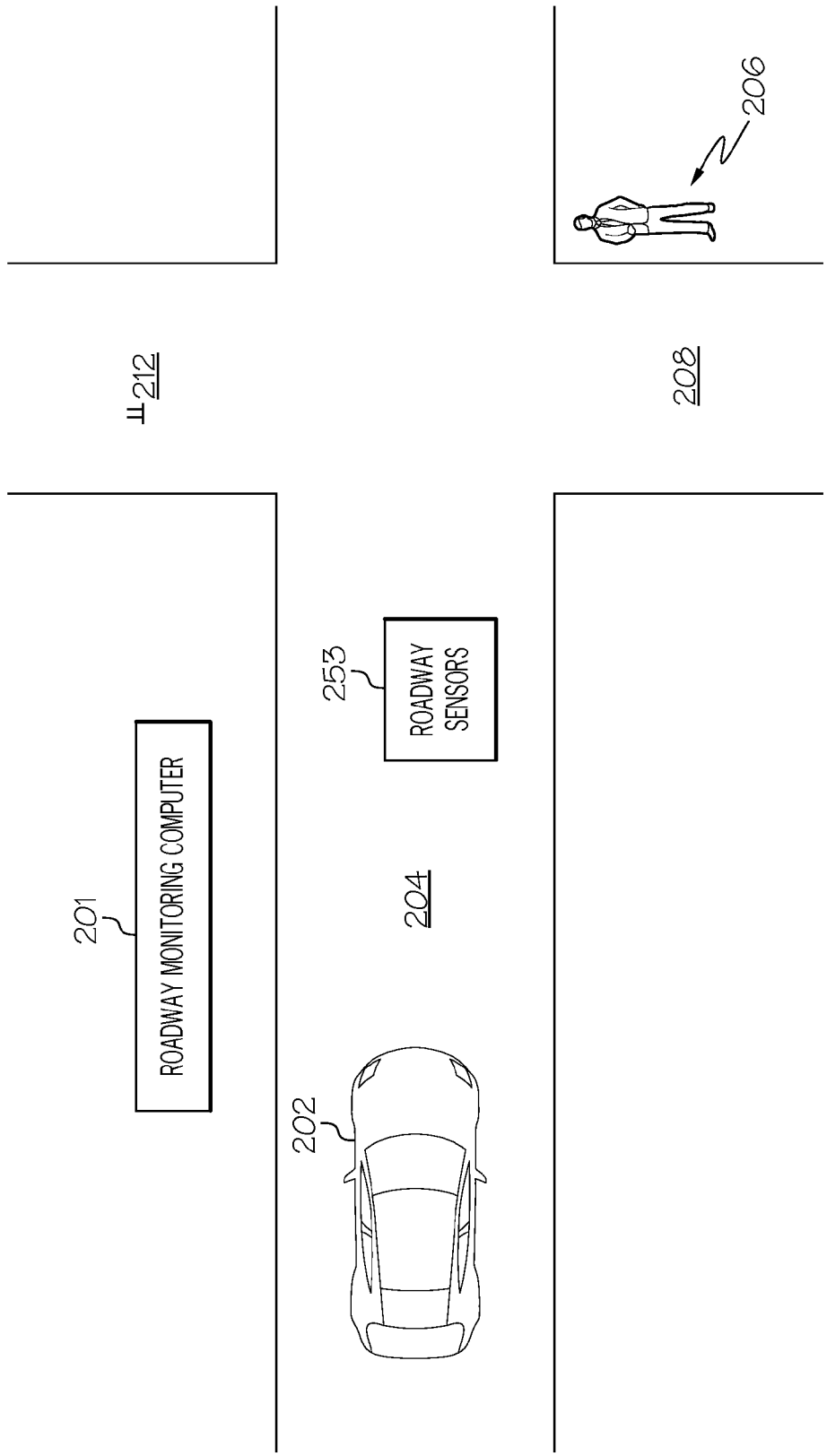
FIG. 2 illustrates an exemplary self-driving vehicle (SDV) approaching a position on a roadway into which a pedestrian may be walking.

With reference now to FIG. 2, an exemplary self-driving vehicle (SDV) 202 is depicted traveling along a roadway 204 in accordance with one or more embodiments of the present invention. As shown, SDV 202 is approaching a pedestrian 206, who is walking towards position 208 on the roadway 204. Position 208 is depicted in FIG. 2 as an intersection, but may be any place on, or in some embodiments, next to roadway 204.

Pedestrian 206 may be any person who is ambulating without the aid of a motorized vehicle. For example, pedestrian 206 may be a person walking without any ambulatory aid, or pedestrian 206 may be a person who is ambulating with the aid of a crutch, cane, wheelchair, is riding a bicycle, etc.

A roadway monitoring computer 201 (analogous to computer 101 shown in FIG. 1) monitors roadway sensors 253 (analogous to sensors 153 shown in FIG. 1), computing devices used by the pedestrian 206, and/or computing devices in the SDV 202.

Examples of roadway sensor 253 include, but are not limited to, moisture sensors, traffic sensors, temperature sensors, light sensors, noise sensors, and traffic light sensors, which are used to detect road conditions on roadway 204.

A moisture sensor may utilize any type of technology for detecting the amount of moisture on the surface of roadway 204. For example, a Frequency Domain Reflectometry (FDR) sensor embedded within roadway 204 can be used to measure a frequency of an oscillating circuit in the FDR, which changes as the amount of moisture on roadway 204 changes. In another embodiment, an ohmmeter embedded on the surface of roadway 204 measures the amount of resistance between two electrical nodes, which changes as the amount of moisture on roadway 204 changes.

A traffic sensor may use any type of sensor that measures the quantity and speed of vehicles traveling on roadway 204. Examples of such traffic sensors include laser sensors that detect passing vehicles on roadway 204 as they break a laser pathway between a laser source and a laser sensor; mechanical pressure hoses mounted on the surface of roadway 204 that provide a change in pressure as cars drive over the hoses; inductive loops embedded within the roadway 204 that generate a field that changes when a metallic vehicle passes over the inductive loop; etc.

A temperature sensor may be a remote sensor that measures infrared emissions from the surface of the roadway 204; a thermocouple embedded within the surface of roadway 204 that measures the surface temperature of roadway 204 based on the change in resistance to the thermocouple caused by changes in roadway surface temperature; etc.

A light sensor may be any type of sensor that detects light levels, including but not limited to, photoresistors whose resistances change based on the amount of ambient light around particular positions on roadway 204.

A noise sensor (i.e., microphone) is any type of acoustic-to-electric sensor that converts sound (audible or non-audible) into an electrical signal, using electromagnetic induction, capacitance change, piezoelectricity induction, etc. imposed on the noise sensor elements by the sound. Thus, if the noise sensor detects a high level of traffic noise (as pre-identified according to a noise pattern indicative of many cars on the roadway 204), then a high level of traffic is inferred. Similarly, if the noise sensor detects a certain frequency/amplitude/volume of noise that has been predetermined to be indicative of a defective road condition (e.g., icy road conditions, potholes, loose pavement, etc.), then this road condition for roadway 204 is understood to exist by the SDV on-board computer 401.

A traffic light sensor may use a light sensor or an electromagnetic signal sensor. That is, a light sensor associated with the SDV on-board computer 401 may "see" a particular color (red, yellow, green) of an upcoming traffic light on the roadway 204, thus inferring that the SDV 202 will need to adjust its operation accordingly. Alternatively, an electromagnetic signal sensor may receive an electromagnetic control signal being broadcast by the traffic light. For example, whenever the traffic light switches from red to green, an electronic signal is also broadcast, notifying any computing device (e.g., SDV on-based computer 401) with an electromagnetic signal receiver of 1) the fact that the traffic light is switching from red to green and/or 2) the location of the traffic light.

In one embodiment of the present invention, sensor readings from roadway sensors 253 shown in FIG. 2 are weighted and summed by a roadway monitoring computer 201 to further adjust the autonomous control of SDV 202. Thus, one or more processors within roadway monitoring computer 201 receive sensor readings from multiple sensors (roadway sensors 253), where each of the multiple sensors detects a different type of current condition of the roadway. The processor(s) weight each of the sensor readings for different current conditions of the roadway, and then sum the weighted sensor readings for the different current conditions of the roadway. The processor(s) determine whether the summed weighted sensor readings exceed a predefined level. In response to determining that the summed weighted sensor readings do exceed a predefined level, then autonomous control of SDV 202 continues in a same manner (e.g., "normal" mode in dry roadway conditions). However, if a first sensor (from roadway sensors 253) detects ice on the roadway 204 and the second sensor (from roadway sensors 253) detects darkness, then the SDV 202 may be shifted to "caution" mode, due to historical data that shows that many more accidents are caused by "black ice" (ice that is not visible to the eye of the driver in dark conditions). Assume further that the first sensor reading (detecting ice on the roadway 204) is weighted at one level (e.g., is multiplied by 5) and the second sensor reading (detecting darkness on the roadway 204) is weighted at another level (e.g., is multiplied by 3). These weighted sensor readings are then added up. If the summed sensor reading weighted values exceed some predetermined value (which has been predetermined based on historic or engineering analyses as being a breakpoint over which the chance of accidents greatly increase), then control of the SDV goes to the more "caution" mode (e.g., gives the SDV more cushion room, greater time to brake, etc.). However, if the summed sensor reading weighted values fall below this predetermined value, then control stays in the "normal" mode (e.g., gives the SDV the default amount of cushion room, time to brake, etc.).

In one embodiment of the present invention, a weighted voting system is used to weight the various variables used in making the decisions regarding whether to place the SDV in the "normal" or "caution" modes described above. Such inputs may include: a history of accidents on a roadway 204 for SDVs in "normal autonomous mode" compared to SDVs on the roadway 204 in "caution autonomous mode", a level of fuel usage/efficiency of SDVs in "normal autonomous mode" compared to SDVs on the roadway 204 in "caution autonomous mode", etc. Such weighted voting approaches may be characterized primarily by three aspects—the inputs (e.g., accident rates, fuel usage), the weights (e.g., weighting accident rates higher than fuel usage levels), and the quota (e.g., how many weighted inputs must be received in order to determine which control mode to use). The inputs are (I1, I2, ..., IN), where "N" denotes the total number of inputs. An input's weight (w) is the number of "votes" associated with the input to determine how significant (weighted) the input is. A quota (q) is the minimum number of votes required to "pass a motion", which in this case refers to a decision made to place the SDV 204 in the "normal autonomous mode" or the "caution autonomous mode".

Figure 3:
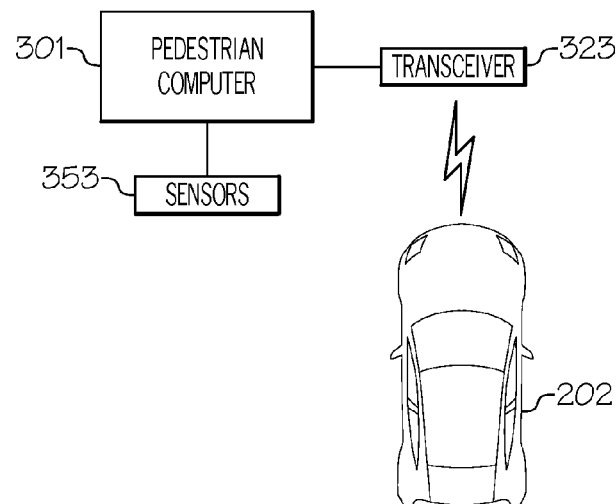
FIG. 3 depicts a pedestrian signal transceiver on the pedestrian communicating with the SDV in FIG. 2.

With reference now to FIG. 3, an exemplary computing device used by the pedestrian is depicted as pedestrian computer 301 (analogous in architecture to computer 101 shown in FIG. 1). Pedestrian computer 301 is coupled to a transceiver 323 (analogous to transceiver 123 shown in FIG. 1), allowing the pedestrian computer 301 to communicate with SDV 202 (or more specifically, to the SDV on-board computer 401 depicted in FIG. 4).

Pedestrian computer 301 may be any type of mobile computing device, such as a smart phone, a tablet computer, a wearable computer, intelligent headgear, etc. Similarly, pedestrian computer 301 may be integrated into a wheelchair, a cane, hearing aid interfaces, audio players, bicycles, and/or any other device that is being used by the pedestrian 206.

As depicted in FIG. 3, sensors 353 (analogous to sensors 153 shown in FIG. 1) are coupled to pedestrian computer 301. Examples of sensors 353 include, but are not limited to, light sensors, microphones, vibration sensors, etc. that are able to detect the presence and movement of SDV 202, as well as ambient conditions (weather, darkness, wind, etc.) of the roadway 204 shown in FIG. 2.

Figure 4:
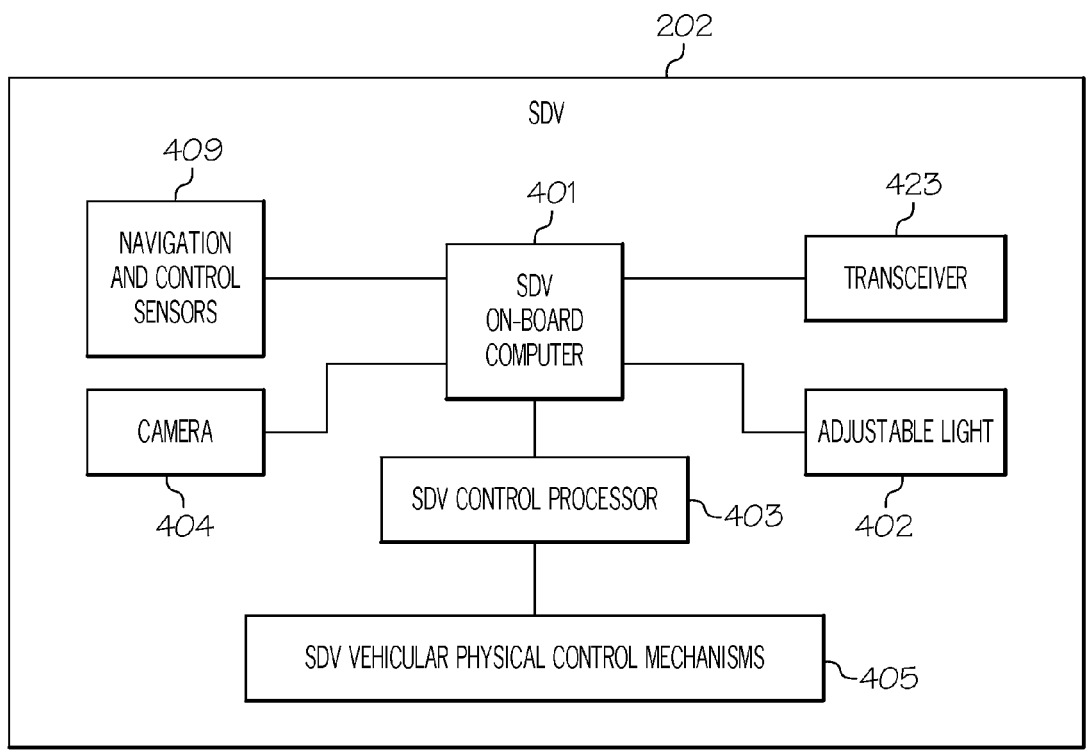
FIG. 4 depicts additional detail of control hardware within the SDV depicted in FIG. 2.

With reference now to FIG. 4, additional detail of hardware components within SDV 202 are depicted.

An SDV on-board computer 401 uses outputs from navigation and control sensors 409 to control the SDV 202. Navigation and control sensors 409 include hardware sensors that 1) determine the location of the SDV 202; 2) sense other cars and/or obstacles and/or physical structures around SDV 202; 3) measure the speed and direction of the SDV 202; and 4) provide any other inputs needed to safely control the movement of the SDV 202.

With respect to the feature of 1) determining the location of the SDV 202, this can be achieved through the use of a positioning system such as positioning system 151 shown in FIG. 1. Positioning system 151 may use a global positioning system (GPS), which uses space-based satellites that provide positioning signals that are triangulated by a GPS receiver to determine a 3-D geophysical position of the SDV 202. Positioning system 151 may also use, either alone or in conjunction with a GPS system, physical movement sensors such as accelerometers (which measure rates of changes to a vehicle in any direction), speedometers (which measure the instantaneous speed of a vehicle), airflow meters (which measure the flow of air around a vehicle), etc. Such physical movement sensors may incorporate the use of semiconductor strain gauges, electromechanical gauges that take readings from drivetrain rotations, barometric sensors, etc.

With respect to the feature of 2) sensing other cars and/or obstacles and/or physical structures around SDV 202, the positioning system 151 may use radar or other electromagnetic energy that is emitted from an electromagnetic radiation transmitter (e.g., transceiver 423 shown in FIG. 4), bounced off a physical structure (e.g., another car), and then received by an electromagnetic radiation receiver (e.g., transceiver 423). By measuring the time it takes to receive back the emitted electromagnetic radiation, and/or evaluate a Doppler shift (i.e., a change in frequency to the electromagnetic radiation that is caused by the relative movement of the SDV 202 to objects being interrogated by the electromagnetic radiation) in the received electromagnetic radiation from when it was transmitted, the presence and location of other physical objects can be ascertained by the SDV on-board computer 301.

With respect to the feature of 3) measuring the speed and direction of the SDV 202, this can be accomplished by taking readings from an on-board speedometer (not depicted) on the SDV 202 and/or detecting movements to the steering mechanism (also not depicted) on the SDV 202 and/or the positioning system 151 discussed above.

With respect to the feature of 4) providing any other inputs needed to safely control the movement of the SDV 202, such inputs include, but are not limited to, control signals to activate a horn, turning indicators, flashing emergency lights, etc. on the SDV 202.

The SDV 202 is able to operate in an autonomous mode, in which the SDV vehicular physical control mechanisms 405 (e.g., the engine throttle, steering mechanisms, braking systems, turn signals, etc.) are controlled by the SDV control processor 403, which is under the control of the SDV on-board computer 401. Thus, by processing inputs taken from navigation and control sensors 409, the SDV 202 can be controlled autonomously.

Furthermore, the SDV on-board controller 401 is able to communicate with other systems, such as the pedestrian computer 301 shown in FIG. 3, via a transceiver 423 (analogous to transceiver 123 shown in FIG. 1).

In one or more embodiments of the present invention, the SDV on-board computer 401 is coupled to a camera 404, which is able to capture (preferably in digital format) still and moving video images, including but not limited to images of pedestrian 206.

Figure 5:
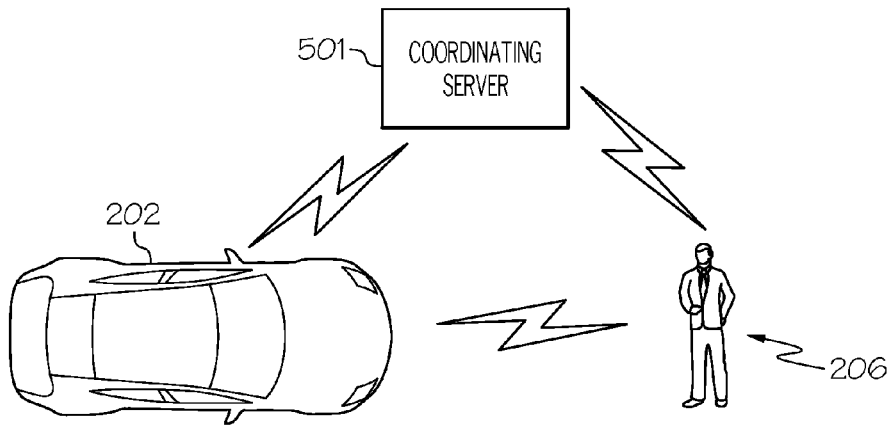
FIG. 5 depicts communication linkages among hardware in the SDV depicted in FIG. 2, hardware carried by the pedestrian depicted in FIG. 2, and a coordinating server in accordance with one or more embodiments of the present invention.

Using their respective transceivers, the coordinating server 501 shown in FIG. 5 (analogous to computer 101 shown in FIG. 1 and/or roadway monitoring computer 201 shown in FIG. 2) is able to communicate with, and thus control computing devices within SDV 202 (e.g., SDV on-board computer 401 shown in FIG. 4), as well as being able to communicate with computing devices with pedestrian 206 (e.g., pedestrian computer 301 shown in FIG. 3).

Figure 6:
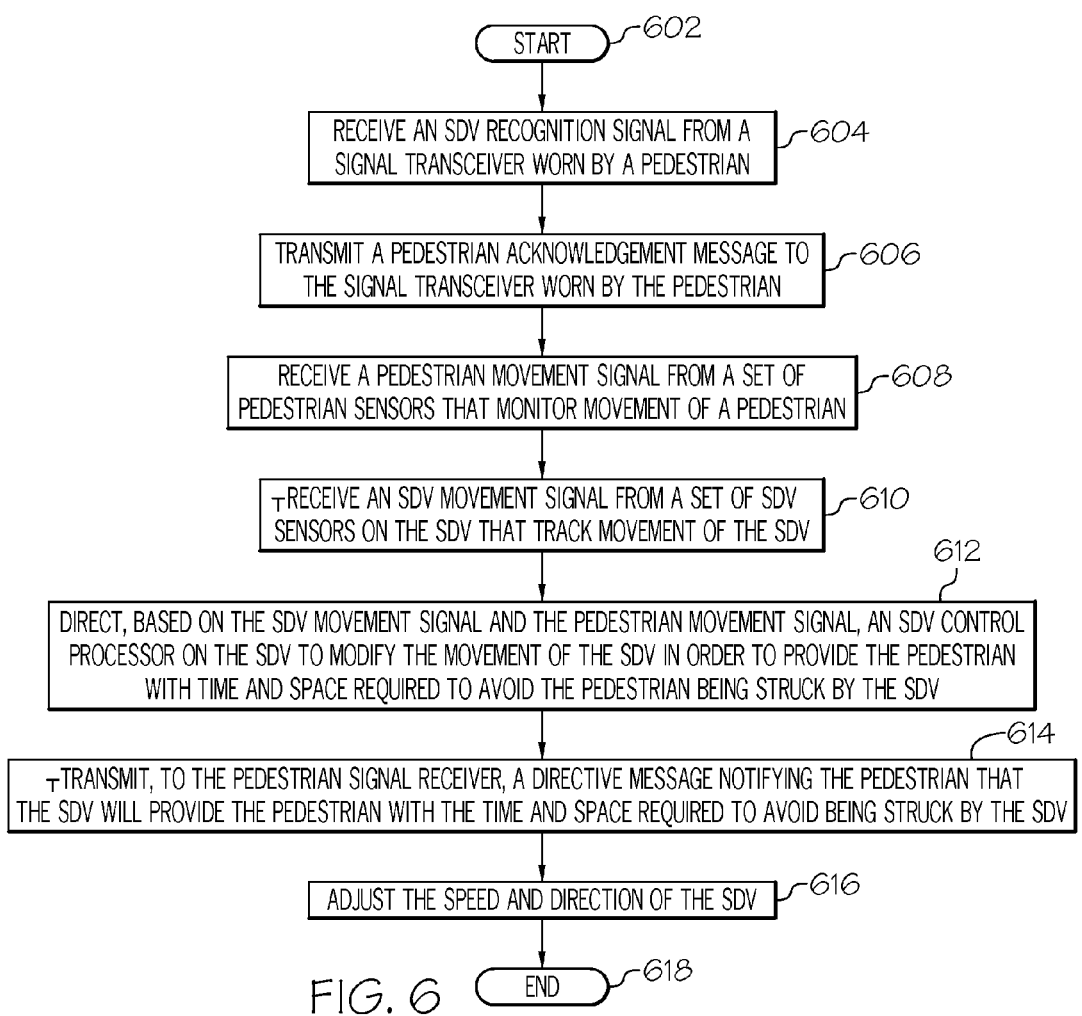
FIG. 6 is a high-level flow chart of one or more steps performed by one or more processors and/or other hardware devices to control a physical interaction between a self-driving vehicle (SDV) and a pedestrian.

With reference now to FIG. 6, a high-level flow chart of one or more operations performed by a processor and/or other hardware devices for controlling a physical interaction between a self-driving vehicle (SDV) and a pedestrian is presented.

After initiator block 602, an SDV on-board computer (e.g., SDV on-board computer 401 in FIG. 4) on the SDV (e.g., SDV 202 shown in FIG. 2) receives an SDV recognition signal from a signal transceiver (e.g., transceiver 323 shown in FIG. 3) worn by a pedestrian (e.g., pedestrian 206 shown in FIG. 2), as described in block 604. The SDV recognition signal indicates that the pedestrian observes a presence of the SDV moving on a roadway towards the pedestrian. This SDV recognition signal may be generated in various manners according to different embodiments of the present invention.

For example, assume that pedestrian 206 is wearing "smart headgear" that includes directional sensors (e.g., accelerometers, strain gauges, etc.) that detect the direction towards which the pedestrian 206 is facing. Assume further that such directional sensors detect that the pedestrian 206 is facing the SDV 202 (assuming that the smart headgear also includes logic that is able to receive a GPS or other positioning signal that identifies wherein the SDV 202 is currently located). Logic within the smart headgear (e.g., using the architecture shown in FIG. 1 for computer 101) is thus able to 1) determine that the pedestrian 206 sees the SDV 202, and 2) generates the SDV recognition signal (assuming that the SDV 202 is close enough to be seen by the pedestrian 206, that lighting conditions are adequate, etc.)

Alternatively, the SDV recognition signal can be generated by a line-of-sight interrogation signal generated by smart headgear being worn by the pedestrian 206. For example, assume that the transceiver 323 shown in FIG. 3 is a laser transceiver, which generates (as a laser generator/transmitter) a highly-directional laser signal. If the laser signal is reflected off the SDV 202 and then detected by the transceiver 323 (now acting as a laser detector/receiver), the logic within the smart headgear is able to generate the SDV recognition signal.

Alternatively, photo/video analysis software executed by SDV on-board computer 401 may take images from camera 404 shown in FIG. 4. These images may include an image of pedestrian 206 making a physical gesture (e.g., a hand held out to indicate that the pedestrian 206 wants the SDV 202 to yield to the pedestrian 206). In response to analysis of the photographic image captured by camera 404 indicating that the pedestrian 202 wants the SDV 202 to yield to the pedestrian, then the SDV recognition signal is generated and/or control of the SDV 202 is adjusted in order to yield the right of way to the pedestrian 206.

Returning now to FIG. 6, a signal transceiver (e.g., transceiver 423 shown as part of SDV 202 in FIG. 4) transmits a pedestrian acknowledgement message to the signal transceiver worn by the pedestrian, as described in block 606 in FIG. 6. The pedestrian acknowledgement message indicates that the SDV on-board computer on the SDV has received the SDV recognition signal from the pedestrian.

As described in block 608, the SDV on-board computer then receives a pedestrian movement signal from a set of pedestrian sensors (e.g., sensors 353 shown in FIG. 3) that monitor movement of the pedestrian. These pedestrian sensors may be accelerometers, GPS-enabled devices, etc. The pedestrian movement signal describes a current speed and direction of movement of the pedestrian as the pedestrian initiates movement towards a position on the roadway that is being approached by the SDV, and the pedestrian movement signal is generated in response to the pedestrian signal receiver receiving the pedestrian acknowledgement message. That is, once the transceiver 323 coupled to the pedestrian computer 301 in FIG. 3 receives the pedestrian acknowledgement message (indicating that the SDV 202 is aware of the presence of the pedestrian 206), then the pedestrian computer 301 starts taking signal readings from the sensors 353 that describe the movement of the pedestrian 206 as he/she moves towards a position on the roadway (204), such as position 208 in the roadway intersection shown in FIG. 2.

As described in block 610, the SDV on-board computer then receives an SDV movement signal from a set of SDV sensors (e.g., navigation and control sensors 409 shown in FIG. 4) on the SDV that track movement of the SDV. Using hardware described above, the navigation and control sensors 409 create the SDV movement signal that describes a current speed and direction of movement of the SDV.

As described in block 612, the SDV on-board computer, based on the SDV movement signal and the pedestrian movement signal, then directs an SDV control processor (e.g., SDV on-board computer 401 shown in FIG. 4) on the SDV to modify the movement of the SDV in order to provide the pedestrian with enough time and space (cushion) to avoid being struck by the SDV as the pedestrian enters the position on the roadway that is being approached by the SDV. That is, the SDV on-board computer 401 calculates how much the velocity should be adjusted (increased or decreased) and/or how much the SDV 202 should be turned (e.g., left or right) in order to give the pedestrian 206 enough time and room to safely pass the position 208 (e.g., cross the intersection) shown in FIG. 2.

As described in block 614, the SDV on-board computer 401 and/or the roadway monitoring computer 201 and/or the coordinating server 501 described above then transmits, to the pedestrian signal receiver, a directive message notifying the pedestrian that the SDV will provide the pedestrian with the time and space required to avoid being struck by the SDV as the pedestrian enters the position on the roadway that is being approached by the SDV. For example, the pedestrian 206 is now informed that he/she will have enough time and room to safely cross the roadway. More specifically, a visual signal and/or an electronic signal is sent to the pedestrian 206 and/or the pedestrian computer 301 indicating that the SDV 202 will provide adequate room/time for the pedestrian 206 to safely enter/cross the roadway 204.

As described in block 616, the SDV control processor on the SDV then adjusts the current speed and direction of movement of the SDV (as promised to the pedestrian 206) in order to avoid striking the pedestrian at the position on the roadway that is being approached by the SDV.

The flow-chart ends at terminator block 618.

In one embodiment of the present invention, movement of the pedestrian 206 is predicted based on the pedestrian 206 matching features of a cohort of pedestrians who have occupied the position 208 on the roadway 204 (e.g., have crossed the roadway 204 at the spot depicted as position 208). Based on this historical data about other similar pedestrians, an assumption is made that the current pedestrian 206 will likewise enter the roadway 204 at position 208 in a similar manner as that of the members of the cohort. For example, assume that pedestrians who have a similar trait (e.g., gait, direction of movement, etc.) as pedestrian 206 have crossed roadway 212 shown in FIG. 2 90% of the time, and have crossed roadway 204 10% of the time when approaching the intersection of roadway 204 and roadway 212. Since pedestrian 206 has the same traits as these similar pedestrians (i.e., within a predefined cohort of pedestrians), a prediction is made that pedestrian 206 will also (or at least is likely to) cross roadway 212 rather than roadway 204, as well as when the pedestrian will pass over the particular position 208.

Thus, in one embodiment of the present invention one or more processors (e.g., within roadway monitoring computer 201 and/or SDV on-board computer 401 and/or coordinating server 501 depicted above) retrieve pedestrian profile information about the pedestrian (e.g., pedestrian 206), and then assign the pedestrian to a cohort of pedestrians who have occupied the position on the roadway (e.g., crossed the roadway at a particular spot) that is being approached by the SDV. As described above, the pedestrian shares more than a predetermined quantity of traits with members of the cohort of pedestrians. One or more processors then retrieve historical data (e.g., stored within computer 101 shown in FIG. 1) that describes movement by members of the cohort of pedestrians when approaching the position on the roadway that is being approached by the SDV. The processor(s) then predict when the pedestrian will reach the position on the roadway that is being approached by the SDV based on the historical data describing movement by members of the cohort of pedestrians when approaching the position on the roadway that is being approached by the SDV. The SDV control processor on the SDV then adjusts the current speed and direction of movement of the SDV according to the historical data describing movement by members of the cohort of pedestrians when approaching the position on the roadway that is being approached by the SDV, in order to avoid hitting the pedestrian.

In an embodiment of the present invention and as described above, the SDV is selectively placed in "normal autonomous mode" or "caution autonomous mode" based on current roadway conditions. Thus, one or more processors receive roadway sensor readings from multiple roadway sensors (e.g., roadway sensors 253 shown in FIG. 2), where each of the multiple roadway sensors detects a different type of current condition of the roadway. The processor(s) assign a weight to each of the roadway sensor readings for different current conditions of the roadway (e.g., weighting wet conditions over dark conditions). The processor(s) then sum the weighted roadway sensor readings for the different current conditions of the roadway, and determine whether or not the summed weighted roadway sensor readings exceed a predefined level (e.g., a numeric value of weighted sensor readings). In response to the processor(s) determining that the summed roadway weighted sensor readings exceed the predefined level, the SDV control processor on the SDV adjusts the current speed and direction of movement of the SDV in order to avoid striking the pedestrian at the position on the roadway that is being approached by the SDV.

In an embodiment of the present invention, autonomous control of the SDV is adjusted on the condition of mechanical systems on the SDV. For example, if the braking system of the SDV is in poor condition (e.g., the brake pads are worn down, such that it takes the SDV longer to stop than if the SDV had new brake pads), then the autonomous mode may be moved from the "normal autonomous mode" described herein to the "caution autonomous mode", thus allowing more distance for stopping the SDV (e.g., applying the brakes sooner, slowing the SDV down, etc.).

Thus, in one embodiment of the present invention, one or more processors (e.g., within the SDV) receive operational readings from one or more operational sensors on the SDV, where the operational sensors detect a current state of equipment on the SDV. The processor(s), based on received operational readings, detect a fault (e.g., a mechanical fault such as faulty brakes, loose steering linkage, etc.) with the equipment on the SDV. In response to detecting the fault with the equipment on the SDV, the SDV control processor on the SDV adjusts the current speed and direction of movement of the SDV in order to avoid striking the pedestrian at the position on the roadway that is being approached by the SDV.

In an embodiment of the present invention, how the SDV interacts with the pedestrian is further adjusted by the presence of a physical entity that is accompanying the pedestrian.

For example, the pedestrian may be looking at a smart phone while walking, and thus may not be as cautious when crossing the street as a pedestrian whose attention is not distracted. For example, if pedestrian 206 is looking down at a smart phone (as recognized by SDV on-board computer 401 using video analysis of images from camera 404, recognition by SDV on-board computer 401 of text data being transmitted from the smart phone, etc.), then an assumption is made that the pedestrian is distracted, and control of the SDV 202 is further adjusted (e.g., by providing additional time/space cushion around the pedestrian 206 in order to compensate for any unexpected movement into the roadway 204 by the pedestrian 206).

In another example, the pedestrian may be exhibiting a gait (e.g., an irregular gait) that is unpredictable. The on-board computer 401 can thus perform a video analysis of images from camera 404, make an assumption that the pedestrian's movement will be irregular and thus hard to predict, and further adjust the control of the SDV 202 (e.g., by providing additional time/space cushion around the pedestrian 206 in order to compensate for any unexpected movement into the roadway 204 by the pedestrian 206).

In another example, the pedestrian may be accompanied by a pet (e.g., a dog on a leash), a child, another person, etc. Again, this accompanying entity may interfere with the attention of the pedestrian, and control of the SDV 202 is adjusted accordingly.

In order to identify an accompanying entity, several embodiments are provided. For example, the presence of the child/dog/smart phone may be detected by a camera on the SDV 202 through the use of image recognition software. In a preferred embodiment, however, the presence of the accompanying entity is identified by an electronic signal being emanated from the accompanying entity. For example, if the accompanying entity is a smart phone, then a short-range electronic signal (e.g., having a range of less than 100') coming from the smart phone is detected by the SDV on-board computer 401, thus providing the notification that the person is carrying a smart phone.

In the example of the accompany entity being a child or pet, a short range signal transmitter (e.g., a collar on a dog) provides the SDV on-board computer 401 with a signal indicating that the pedestrian is being accompanied by the dog, and thus may be distracted, pulled suddenly by the dog, etc.

Thus, in one embodiment of the present invention, the on-board computer on the SDV receives accompaniment signals regarding the pedestrian. These accompaniment signals describe a physical entity that is accompanying the pedestrian. One or more processors (e.g., within SDV on-board computer 401) retrieve historical data that describes other pedestrians who have occupied the position in the roadway with a same type of physical entity as the physical entity that is accompanying the pedestrian. For example, the processors retrieve data about other pedestrians crossing the street at the same location as pedestrian 206 shown in FIG. 2, and are also accompanied by the same type of pet (e.g., a dog weighing more than 40 pounds) as the pet that is currently accompanying the pedestrian 206. The processor(s) then generate, based on the historical data that describes other pedestrians who have occupied the position in the roadway with the same type of physical entity, a predicted speed and direction of movement of the pedestrian toward the position on the roadway. The SDV control processor on the SDV then adjusts the current speed and direction of movement of the SDV based on the predicted speed and direction of movement of the pedestrian toward the position on the roadway, in order to avoid striking the pedestrian.

In one embodiment of the present invention, the SDV provides the pedestrian with a visual indication of its adjusted speed/direction. For example, assume that mounted on the SDV 202 is an adjustable light (e.g., adjustable light 402 shown in FIG. 4). The SDV on-board computer 401 is able to selectively adjust the color, intensity, flashing frequency, etc. of the adjustable light. Thus, if the SDV on-board computer 401 has directed and controlled the SDV 202 to adjust its speed and/or direction enough to allow the pedestrian to cross the roadway 204, then a visually coded (e.g., going from red to green, going from rapid flashing to slow flashing, etc.) light is emitted from the adjustable light, letting the pedestrian know that he/she has adequate time to cross the roadway 204.

Thus, in an embodiment of the present invention, adjusting the current speed and direction of movement of the SDV creates an adjusted speed and direction of the SDV, and an adjustable light on the SDV transmits a visual indication of the adjusted current speed and direction of the SDV to the pedestrian.

In an embodiment of the present invention, mutually supportive sensors are used to indicate that the pedestrian has seen the SDV. For example, assume that a laser pointer mounted on the pedestrian's headgear indicate that the pedestrian 206 is facing the oncoming SDV 202, as described above. However, this does not ensure that pedestrian 206 actually sees the oncoming SDV 202. Thus, another supportive sensor is also used, such as a biometric sensor. That is, assume that the sensors 353 shown in FIG. 3 include biometric sensors that measure the heart rate, blood pressure, breathing rate, etc. of the pedestrian 206. A spike in biometric readings (e.g., a jump in blood pressure for the pedestrian) alone is also not dispositive of the pedestrian looking at the oncoming SDV. However, if the laser is pointed at the SDV 202 at the same moment that the blood pressure on the pedestrian 206 spikes, then an assumption can be made that the pedestrian 206 is in fact looking at the oncoming SDV 202, due to the pedestrian's concern for his/her safety.

Thus, in one embodiment of the present invention, an initial SDV recognition signal is generated by a first SDV recognition sensor (e.g., a laser signal aimed at the SDV and then bounced back to the laser sensor on the pedestrian), and a supportive recognition signal is generated by a second SDV recognition sensor (e.g., the biometric sensor). The SDV on-board computer on the SDV receives both the initial SDV recognition signal and the supportive SDV recognition signal, and compares the two SDV recognition signals. One or more processors (e.g., within SDV on-board computer 401) then establish a confidence level of the initial SDV recognition signal based on a level of similarity between the initial SDV recognition signal and the supportive SDV recognition signal. That is, if the signal generated by first SDV recognition sensor (e.g., the laser system) shows the same historical characteristics of a pedestrian looking at an oncoming SDV, and the signal generated by the second SDV recognition sensor (e.g., the blood pressure sensor) also shows these same historical characteristics of a pedestrian looking at an oncoming SDV, then a conclusion is drawn that the pedestrian is in fact looking at and recognizing the presence of the oncoming SDV.

In one or more embodiments, the present invention is implemented in a cloud environment. It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
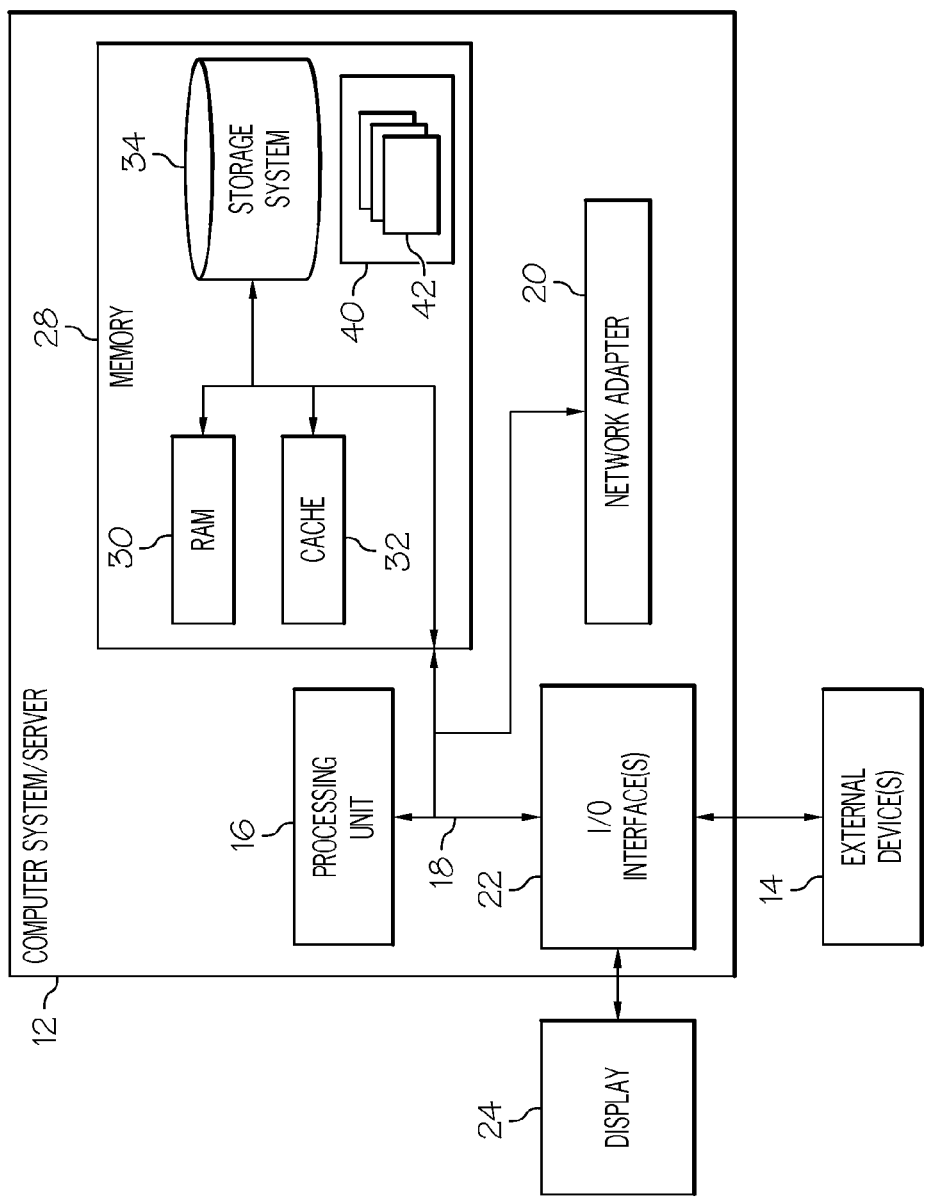
FIG. 7 depicts a cloud computing node according to an embodiment of the present disclosure.

Referring now to FIG. 7, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 8:
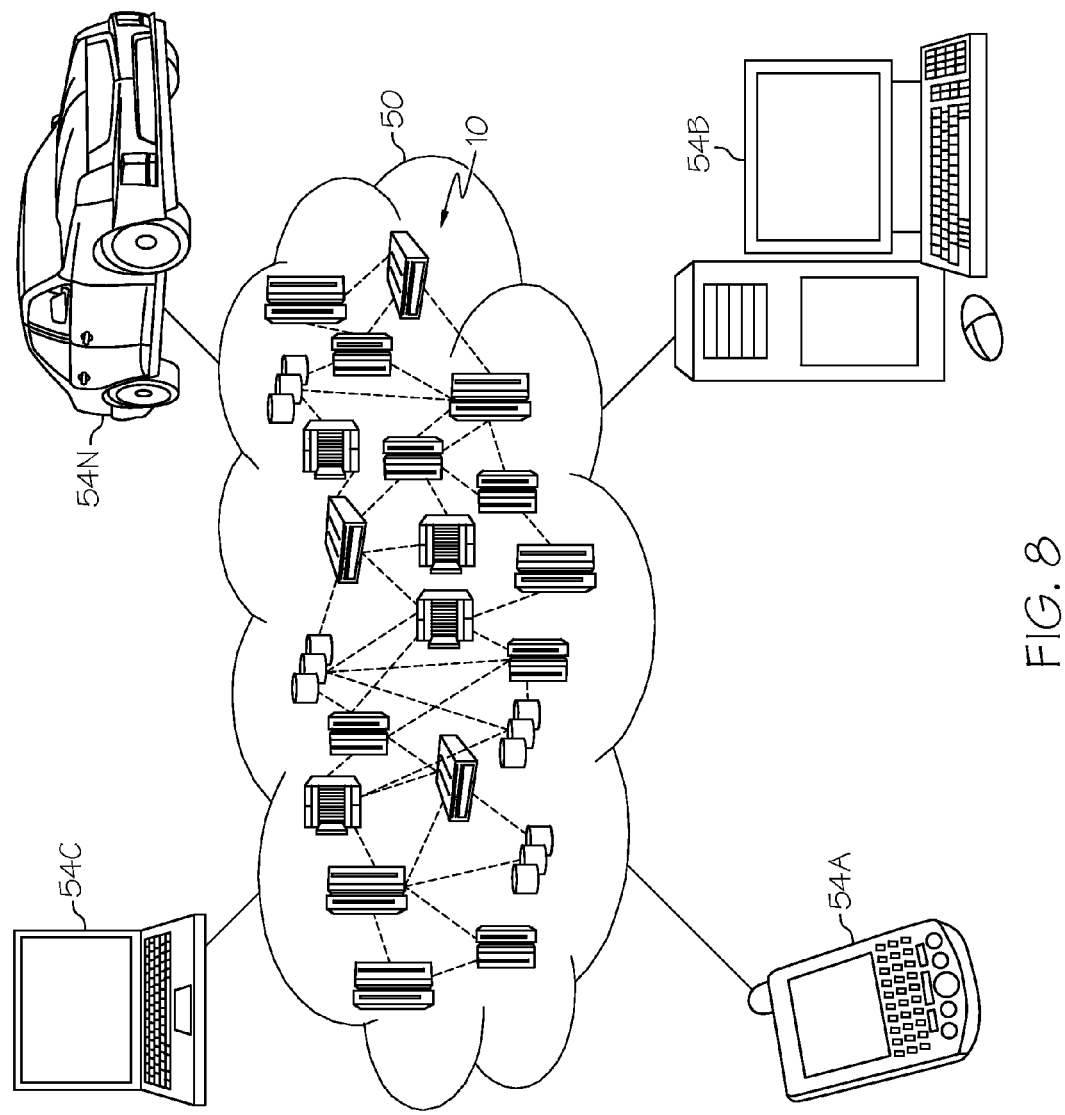
FIG. 8 depicts a cloud computing environment according to an embodiment of the present disclosure.

Referring now to FIG. 8, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and self-driving vehicle control processing 96 (for controlling a physical interaction between an SDV and a pedestrian as described herein).

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A computer-implemented method for controlling a physical interaction between a self-driving vehicle (SDV) and a pedestrian, the computer-implemented method comprising:
    receiving, by an SDV on-board computer on the SDV, an SDV recognition signal from a pedestrian signal transceiver worn by the pedestrian, wherein the SDV recognition signal indicates that the pedestrian observes a presence of the SDV moving on a roadway towards the pedestrian;
    transmitting, by an SDV signal transceiver, a pedestrian acknowledgement message to the pedestrian signal transceiver worn by the pedestrian, wherein the pedestrian acknowledgement message indicates that the SDV on-board computer on the SDV has received the SDV recognition signal from the pedestrian;
    receiving, by the SDV on-board computer, a pedestrian movement signal from a set of pedestrian sensors that monitor movement of the pedestrian, wherein the pedestrian movement signal describes a current speed and direction of movement of the pedestrian as the pedestrian initiates movement towards a position on the roadway that is being approached by the SDV, and wherein the pedestrian movement signal is generated in response to the pedestrian signal receiver receiving the pedestrian acknowledgement message;
    receiving, by the SDV on-board computer, an SDV movement signal from a set of SDV sensors on the SDV that track movement of the SDV, wherein the SDV movement signal describes a current speed and direction of movement of the SDV;
    directing, by the SDV on-board computer and based on the SDV movement signal and the pedestrian movement signal, an SDV control processor on the SDV to modify the movement of the SDV in order to provide the pedestrian with time and space required to avoid being struck by the SDV as the pedestrian enters the position on the roadway that is being approached by the SDV;
    transmitting, to the pedestrian signal receiver, a directive message notifying the pedestrian that the SDV will provide the pedestrian with the time and space required to avoid being struck by the SDV as the pedestrian enters the position on the roadway that is being approached by the SDV;
    adjusting, by the SDV control processor on the SDV, the current speed and direction of movement of the SDV in order to avoid striking the pedestrian at the position on the roadway that is being approached by the SDV;
    retrieving, by one or more processors, pedestrian profile information about the pedestrian;
    assigning, by the one or more processors, the pedestrian to a cohort of pedestrians who have occupied the position on the roadway that is being approached by the SDV, wherein the pedestrian shares more than a predetermined quantity of traits with members of the cohort of pedestrians;
    retrieving, by the one or more processors, historical data describing movement by the members of the cohort of pedestrians when approaching the position on the roadway that is being approached by the SDV;
    predicting, by the one or more processors, when the pedestrian will reach the position on the roadway that is being approached by the SDV based on the historical data describing the movement by the members of the cohort of pedestrians when approaching the position on the roadway that is being approached by the SDV; and
    adjusting, by the SDV control processor on the SDV, the current speed and direction of movement of the SDV according to the historical data describing the movement by the members of the cohort of pedestrians when approaching the position on the roadway that is being approached by the SDV.

2. The computer-implemented method of claim 1, further comprising:
    receiving, by the one or more processors, roadway sensor readings from multiple roadway sensors, wherein each of the multiple roadway sensors detects different current conditions of the roadway;
    weighting, by the one or more processors, each of the roadway sensor readings for the different current conditions of the roadway;
    summing, by the one or more processors, weighted roadway sensor readings for the different current conditions of the roadway;
    determining, by the one or more processors, whether the summed weighted roadway sensor readings exceed a predefined level; and in response to determining that the summed roadway weighted sensor readings exceed the predefined level, adjusting, by the SDV control processor on the SDV, the current speed and direction of movement of the SDV in order to avoid striking the pedestrian at the position on the roadway that is being approached by the SDV.

3. The computer-implemented method of claim 1, further comprising:

receiving, by the one or more processors, operational readings from one or more operational sensors on the SDV, wherein the one or more operational sensors detect a current state of equipment on the SDV;

detecting, by the one or more processors and based on the received operational readings, a fault with the equipment on the SDV; and in response to detecting the fault with the equipment on the SDV, adjusting, by the SDV control processor on the SDV, the current speed and direction of movement of the SDV in order to avoid striking the pedestrian at the position on the roadway that is being approached by the SDV.

4. The computer-implemented method of claim 1, further comprising:

receiving, by the on-board computer on the SDV, accompaniment signals regarding the pedestrian, wherein the accompaniment signals describe a physical entity that is accompanying the pedestrian;

retrieving, by the one or more processors, the historical data that describes other pedestrians who have occupied the position in the roadway with a physical entity whose features match those of the physical entity that is accompanying the pedestrian;

generating, by the one or more processors and based on the historical data that describes other pedestrians who have occupied the position in the roadway with the physical entity, a predicted speed and direction of movement of the pedestrian toward the position on the roadway; and adjusting, by the SDV control processor on the SDV, the current speed and direction of movement of the SDV based on the predicted speed and direction of movement of the pedestrian toward the position on the roadway, in order to avoid striking the pedestrian.

5. The computer-implemented method of claim 1, wherein adjusting the current speed and direction of movement of the SDV creates an adjusted speed and direction of the SDV, and wherein the processor-implemented method further comprises:

transmitting, by an adjustable light on the SDV, a visual indication of the adjusted current speed and direction of the SDV to the pedestrian.

6. The computer-implemented method of claim 1, wherein the SDV recognition signal is an initial SDV recognition signal that is generated by a first SDV recognition sensor, and wherein the processor-implemented method further comprises:

receiving, by the SDV on-board computer on the SDV, a supportive SDV recognition signal from a second SDV recognition sensor;

comparing, by the one or more processors, the initial SDV recognition signal to the supportive SDV recognition signal; and establishing, by the one or more processors, a confidence level of the initial SDV recognition signal based on a level of similarity between the initial SDV recognition signal and the supportive SDV recognition signal.

7. A computer program product for controlling a physical interaction between a self-driving vehicle (SDV) and a pedestrian, the computer program product comprising a non-transitory computer readable storage medium having program code embodied therewith, the program code readable and executable by a processor to perform a method comprising:

receiving an SDV recognition signal from a pedestrian signal transceiver worn by the pedestrian, wherein the SDV recognition signal indicates that the pedestrian observes a presence of the SDV moving on a roadway towards the pedestrian;

transmitting a pedestrian acknowledgement message to the pedestrian signal transceiver worn by the pedestrian, wherein the pedestrian acknowledgement message indicates that an SDV on-board computer on the SDV has received the SDV recognition signal from the pedestrian;

receiving a pedestrian movement signal from a set of pedestrian sensors that monitor movement of the pedestrian, wherein the pedestrian movement signal describes a current speed and direction of movement of the pedestrian as the pedestrian initiates movement towards a position on the roadway that is being approached by the SDV, and wherein the pedestrian movement signal is generated in response to the pedestrian signal receiver receiving the pedestrian acknowledgement message;

receiving an SDV movement signal from a set of SDV sensors on the SDV that track movement of the SDV, wherein the SDV movement signal describes a current speed and direction of movement of the SDV;

directing, based on the SDV movement signal and the pedestrian movement signal, an SDV control processor on the SDV to modify the movement of the SDV in order to provide the pedestrian with time and space required to avoid being struck by the SDV as the pedestrian enters the position on the roadway that is being approached by the SDV;

transmitting, to the pedestrian signal receiver, a directive message notifying the pedestrian that the SDV will provide the pedestrian with the time and space required to avoid being struck by the SDV as the pedestrian enters the position on the roadway that is being approached by the SDV;

adjusting, via the SDV control processor on the SDV, the current speed and direction of movement of the SDV in order to avoid striking the pedestrian at the position on the roadway that is being approached by the SDV;

retrieving pedestrian profile information about the pedestrian;

assigning the pedestrian to a cohort of pedestrians who have occupied the position on the roadway that is being approached by the SDV, wherein the pedestrian shares more than a predetermined quantity of traits with members of the cohort of pedestrians;

retrieving historical data describing movement by the members of the cohort of pedestrians when approaching the position on the roadway that is being approached by the SDV;

predicting when the pedestrian will reach the position on the roadway that is being approached by the SDV based on the historical data describing the movement by the members of the cohort of pedestrians when approaching the position on the roadway that is being approached by the SDV; and adjusting, via the SDV control processor on the SDV, the current speed and direction of movement of the SDV according to the historical data describing the movement by the members of the cohort of pedestrians when approaching the position on the roadway that is being approached by the SDV.

8. The computer program product of claim 7, wherein the method further comprises:
receiving roadway sensor readings from multiple roadway sensors, wherein each of the multiple roadway sensors detects different current conditions of the roadway;
weighting each of the roadway sensor readings for the different current conditions of the roadway;
summing weighted roadway sensor readings for the different current conditions of the roadway;
determining whether the summed weighted roadway sensor readings exceed a predefined level; and
in response to determining that the summed roadway weighted sensor readings exceed the predefined level, adjusting, via the SDV control processor on the SDV, the current speed and direction of movement of the SDV in order to avoid striking the pedestrian at the position on the roadway that is being approached by the SDV.

9. The computer program product of claim 7, wherein the method further comprises:
receiving operational readings from one or more operational sensors on the SDV, wherein the one or more operational sensors detect a current state of equipment on the SDV;
detecting, based on the received operational readings, a fault with the equipment on the SDV; and
in response to detecting the fault with the equipment on the SDV, adjusting, via the SDV control processor on the SDV, the current speed and direction of movement of the SDV in order to avoid striking the pedestrian at the position on the roadway that is being approached by the SDV.

10. The computer program product of claim 7, wherein the method further comprises:
receiving accompaniment signals regarding the pedestrian, wherein the accompaniment signals describe a physical entity that is accompanying the pedestrian;
retrieving historical data that describes other pedestrians who have occupied the position in the roadway with the physical entity whose features match those of the physical entity that is accompanying the pedestrian;
generating, based on the historical data that describes other pedestrians who have occupied the position in the roadway with the physical entity, a predicted speed and direction of movement of the pedestrian toward the position on the roadway; and
adjusting, via the SDV control processor on the SDV, the current speed and direction of movement of the SDV based on the predicted speed and direction of movement of the pedestrian toward the position on the roadway, in order to avoid striking the pedestrian.

11. The computer program product of claim 7, wherein adjusting the current speed and direction of movement of the SDV creates an adjusted speed and direction of the SDV, and wherein the method further comprises:
transmitting, by an adjustable light on the SDV, a visual indication of the adjusted current speed and direction of the SDV to the pedestrian.

12. The computer program product of claim 7, wherein the SDV recognition signal is an initial SDV recognition signal that is generated by a first SDV recognition sensor, and wherein the method further comprises:
receiving a supportive SDV recognition signal from a second SDV recognition sensor;
comparing the initial SDV recognition signal to the supportive SDV recognition signal; and
establishing a confidence level of the initial SDV recognition signal based on a level of similarity between the initial SDV recognition signal and the supportive SDV recognition signal.

13. A computer system for causing a self-driving vehicle (SDV) to avoid a physical encounter with a pedestrian, comprising:
one or more processors;
one or more computer readable memories, and
one or more non-transitory computer readable storage mediums, and wherein program instructions stored on at least one of the one or more non-transitory storage mediums for execution by at least one of the one or more processors via at least one of the one or more memories, to perform a method, the method comprising:
receiving an SDV recognition signal from a pedestrian signal transceiver worn by the pedestrian, wherein the SDV recognition signal indicates that the pedestrian observes a presence of the SDV moving on a roadway towards the pedestrian;
transmitting a pedestrian acknowledgement message to the pedestrian signal transceiver worn by the pedestrian, wherein the pedestrian acknowledgement message indicates that an SDV on-board computer on the SDV has received the SDV recognition signal from the pedestrian;
receiving a pedestrian movement signal from a set of pedestrian sensors that monitor movement of the pedestrian, wherein the pedestrian movement signal describes a current speed and direction of movement of the pedestrian as the pedestrian initiates movement towards a position on the roadway that is being approached by the SDV, and wherein the pedestrian movement signal is generated in response to the pedestrian signal receiver receiving the pedestrian acknowledgement message;
receiving an SDV movement signal from a set of SDV sensors on the SDV that track movement of the SDV, wherein the SDV movement signal describes a current speed and direction of movement of the SDV;
directing, based on the SDV movement signal and the pedestrian movement signal, an SDV control processor on the SDV to modify the movement of the SDV in order to provide the pedestrian with time and space required to avoid being struck by the SDV as the pedestrian enters the position on the roadway that is being approached by the SDV;
transmitting, to the pedestrian signal receiver, a directive message notifying the pedestrian that the SDV will provide the pedestrian with the time and space required to avoid being struck by the SDV as the pedestrian enters the position on the roadway that is being approached by the SDV;
adjusting, via the SDV control processor on the SDV, the current speed and direction of movement of the SDV in order to avoid striking the pedestrian at the position on the roadway that is being approached by the SDV;
retrieving pedestrian profile information about the pedestrian;

assigning the pedestrian to a cohort of pedestrians who have occupied the position on the roadway that is being approached by the SDV, wherein the pedestrian shares more than a predetermined quantity of traits with members of the cohort of pedestrians;

retrieving historical data describing movement by the members of the cohort of pedestrians when approaching the position on the roadway that is being approached by the SDV;

predicting when the pedestrian will reach the position on the roadway that is being approached by the SDV based on the historical data describing the movement by the members of the cohort of pedestrians when approaching the position on the roadway that is being approached by the SDV; and adjusting, via the SDV control processor on the SDV, the current speed and direction of movement of the SDV according to the historical data describing the movement by the members of the cohort of pedestrians when approaching the position on the roadway that is being approached by the SDV.

14. The computer system of claim 13, wherein the method further comprises:

receiving roadway sensor readings from multiple roadway sensors, wherein each of the multiple roadway sensors detects different current conditions of the roadway;

weighting each of the roadway sensor readings for the different current conditions of the roadway;

summing weighted roadway sensor readings for the different current conditions of the roadway;

determining whether the summed weighted roadway sensor readings exceed a predefined level; and in response to determining that the summed roadway weighted sensor readings exceed the predefined level, adjusting, via the SDV control processor on the SDV, the current speed and direction of movement of the SDV in order to avoid striking the pedestrian at the position on the roadway that is being approached by the SDV.

15. The computer system of claim 13, wherein the method further comprises:

receiving operational readings from one or more operational sensors on the SDV, wherein the one or more operational sensors detect a current state of equipment on the SDV;

detecting, based on the received operational readings, a fault with the equipment on the SDV; and in response to detecting the fault with the equipment on the SDV, adjusting, via the SDV control processor on the SDV, the current speed and direction of movement of the SDV in order to avoid striking the pedestrian at the position on the roadway that is being approached by the SDV.

16. The computer system of claim 13, wherein the method further comprises:

receiving accompaniment signals regarding the pedestrian, wherein the accompaniment signals describe a physical entity that is accompanying the pedestrian;

retrieving the historical data that describes other pedestrians who have occupied the position in the roadway with a physical entity whose features match those of the physical entity that is accompanying the pedestrian;

generating, based on the historical data that describes other pedestrians who have occupied the position in the roadway with the physical entity, a predicted speed and direction of movement of the pedestrian toward the position on the roadway; and adjusting, via the SDV control processor on the SDV, the current speed and direction of movement of the SDV based on the predicted speed and direction of movement of the pedestrian toward the position on the roadway, in order to avoid striking the pedestrian.

17. The computer system of claim 13, wherein adjusting the current speed and direction of movement of the SDV creates an adjusted speed and direction of the SDV, and wherein the method further comprises:

transmitting, by an adjustable light on the SDV, a visual indication of the adjusted current speed and direction of the SDV to the pedestrian.

* * * * *